US 6,616,244 B2

(12) United States Patent
Häkkinen

(10) Patent No.: US 6,616,244 B2
(45) Date of Patent: Sep. 9, 2003

(54) METHOD AND ARRANGEMENT FOR DETERMINING POSITION OF UNMANNED MINING VEHICLES

(75) Inventor: Leo Häkkinen, Tampere (FI)

(73) Assignee: Sandvik Tamrock (FI)

(*) Notice: Subject to any disclaimer, the term of this patent is extended or adjusted under 35 U.S.C. 154(b) by 0 days.

(21) Appl. No.: 10/241,438

(22) Filed: Sep. 12, 2002

(65) Prior Publication Data

US 2003/0052529 A1 Mar. 20, 2003

Related U.S. Application Data

(63) Continuation of application No. PCT/FI01/00264, filed on Mar. 16, 2001.

(30) Foreign Application Priority Data

Mar. 17, 2000 (FI) .............................. 20000628

(51) Int. Cl.⁷ .................... E21C 35/08; E21C 35/24; G05D 1/00
(52) U.S. Cl. .................... 299/1.05; 299/30; 701/23
(58) Field of Search ................. 299/1.05, 1.4, 299/1.5, 1.6, 1.8, 19, 30; 701/23, 28

(56) References Cited

U.S. PATENT DOCUMENTS

| 4,586,571 A | 5/1986 | Rajakallio et al. |
| 4,716,530 A | 12/1987 | Ogawa et al. |
| 5,041,722 A | 8/1991 | Suzuki et al. |
| 5,530,330 A | 6/1996 | Baiden et al. |
| 5,911,767 A | 6/1999 | Garibotto et al. |
| 6,349,249 B1 * | 2/2002 | Cunningham ........ 701/23 |

FOREIGN PATENT DOCUMENTS

| AU | 9500680-5 | 2/1995 |
| EP | 0 208 885 | 1/1987 |
| EP | 0952427 A2 | 10/1999 |
| JP | 5033578 | 2/1993 |
| JP | 5118849 | 5/1993 |

* cited by examiner

Primary Examiner—David Bagnell
Assistant Examiner—Brian Halford
(74) Attorney, Agent, or Firm—Burns, Doane, Swecker & Mathis, L.L.P.

(57) ABSTRACT

A method of determining the position of unmanned mining vehicles. According to the method, control marks are provided in the mine, for positioning mining vehicles in production use by means of a marking device, such as a paint sprayer (14), provided in a specific measuring vehicle (3). The invention also relates to a measuring vehicle that is unmanned and comprises a measuring device for measuring a mine and also a marking device for providing a mine gallery with control marks.

10 Claims, 4 Drawing Sheets

METHOD AND ARRANGEMENT FOR DETERMINING POSITION OF UNMANNED MINING VEHICLES

This application is a Continuation of International Application PCT/FI01/00264 filed on Mar. 16, 2001, which designated the U.S. and was published under PCT Article 21(2) in English.

BACKGROUND OF THE INVENTION

The invention relates to a method of determining the position of unmanned mining vehicles, according to which method excavated mine galleries are measured and control marks are provided in the mine galleries, the marks being used in controlling a mining vehicle.

The invention also relates to a measuring vehicle comprising a mobile base, control devices for driving it unmanned in a mine from a control room arranged outside a mine section to be operated, a data communication unit for transmitting control and measurement information between the control room and the vehicle, and at least one measuring device by which a mine gallery is measured.

Mines are planned such that ore in the rock can be utilized as efficiently as possible and that the mining is efficient. Thus, a mining plan and map of a mine are prepared, according to which mine galleries are made. Among others, the number, length, direction, inclination, profile etc. of the mine galleries are determined in advance. The actual mining of the ore is performed in hard rock, for example such that a so-called fan is drilled in the rock, the fan having a required number of holes according to the drilling plan, the holes being then charged with an explosive. A tunnel, for its part, is done in so-called rounds. The purpose is to separate a part of a desired direction and depth from the rock by exploding, and a further aim is to form blocks of a suitable size, which blocks can be handled, for example, by a loading vehicle to be driven to the gallery. To keep the direction and dimensions of the mine galleries as planned, control measurements have to be carried out at certain intervals in the mine galleries. Conventionally measurements in a mine have been carried out manually. Measuring persons thereby go and determine the right direction of the tunnel by measuring, and similarly in the ore mining, they determine the location of the next fan to be drilled by using distance measurement based on laser, for instance. Manual measurement is, however, slow and the working in a mine may also be dangerous. After the performed measurements, positioning marks are marked, usually by a paint, on the walls of the mine gallery. The rock drilling apparatus is thus positioned at a mark in the manner disclosed in the publication U.S. Pat. No. 4,586,571, for instance. Light sources, such as lasers, pointing to the sides of the rock drilling apparatus are thus fixedly arranged at the apparatus, whereby the rock drilling apparatus is placed at the fan to be drilled, such that the light beams of the light sources are directed at the marks on the walls of the mine gallery. Alternatively, the positioning is made as in the AU publication 700 301. The purpose is to make sure that the mining of the ore continues according to the mining plan.

Furthermore, arrangements are known, which utilize a so-called tunnel laser, i.e. a laser fixedly arranged in the gallery, and a prism/sight arranged in the mining vehicle, or a laser arranged in the mining vehicle and reference points, such as reflectors, correspondingly mounted fixedly at predetermined places in the mine gallery. These solutions, however, always require that a fixed infrastructure is built into the mine. Further, said systems are subject to various errors, wherefore their reliability in demanding mine conditions is questionable.

Already in the near future, more and more unmanned production is taken into use in mines. This refers to so-called teleoperated rock drilling apparatuses, loading vehicles and other mining vehicles, which can be controlled from an external, for example overground, control room by means of video cameras, for instance. Furthermore, a so-called inertial navigation device known per se can be utilized in driving mining vehicles, the operation of which device being based on the gravitational fields of the earth. Such an inertial navigator is otherwise a useful and exact device, but its disadvantage is a high price.

BRIEF DESCRIPTION OF THE INVENTION

It is an object of the present invention to provide a new kind of solution for determining the position of unmanned mining vehicles in a mine gallery.

The method of the invention is characterized by measuring the mine by means of an unmanned measuring vehicle and by marking the control marks by means of a marking device in the measuring vehicle.

Further, the measuring vehicle of the invention is characterized in that the measuring vehicle comprises a marking device for marking control marks onto the mine gallery in order to control other mining vehicles and determine the position thereof.

The essential idea of the invention is that a teleoperated measuring vehicle used for surveying a mine gallery is provided with a marking device, by which control marks are marked in the mine gallery for other mining vehicles. Thus, these marks are utilized in controlling teleoperated and fully automatic rock drilling apparatuses and loading vehicles, which are in production use. An essential idea of the embodiment of the invention is that the control marks are painted on the wall surfaces/roof of the mine gallery by means of paint sprayers arranged in the measuring vehicle.

The invention provides the advantage that no fixed infrastructure has to be built into the mine itself to control unmanned vehicles. Thus the investment costs of the mine can be lower. Further, mining vehicles to be used in the production need not necessarily be provided with measuring and positioning means, such as with inertial navigation devices and the like, but the sensitive and expensive measuring devices are arranged in a separate measuring vehicle. The invention also makes the mining faster, as the operation in an unmanned mine need not be interrupted due to the mounting of the marks, because the marking is carried out safely by means of an unmanned teleoperated measuring device. It is relatively simple to provide the measuring vehicle with the marking equipment of the invention, such as paint sprayers, and it does not cause any significant additional costs. By using the marking equipment, also location information can simultaneously be marked in the mine gallery, the information being utilized in controlling the mining vehicle. An independently controllable mining vehicle has a reading device for reading the location information, in which case the vehicle can be controlled and positioned automatically.

BRIEF DESCRIPTION OF THE DRAWINGS

The invention will be described in greater detail in the attached drawings, in which FIG. 1 schematically shows a top view of a part of a mine, and FIG. 2 perspectively shows a mine gallery, FIG. 3 schematically shows a top view of a rock drilling apparatus positioned in a mine gallery, FIG. 4 schematically shows a side view of a measuring vehicle according to the invention in a mine gallery, FIG. 5 schematically shows a side view of a loading vehicle, and FIGS. 6 and 7 schematically show some further embodiments.

DETAILED DESCRIPTION OF THE INVENTION

Figure 1:
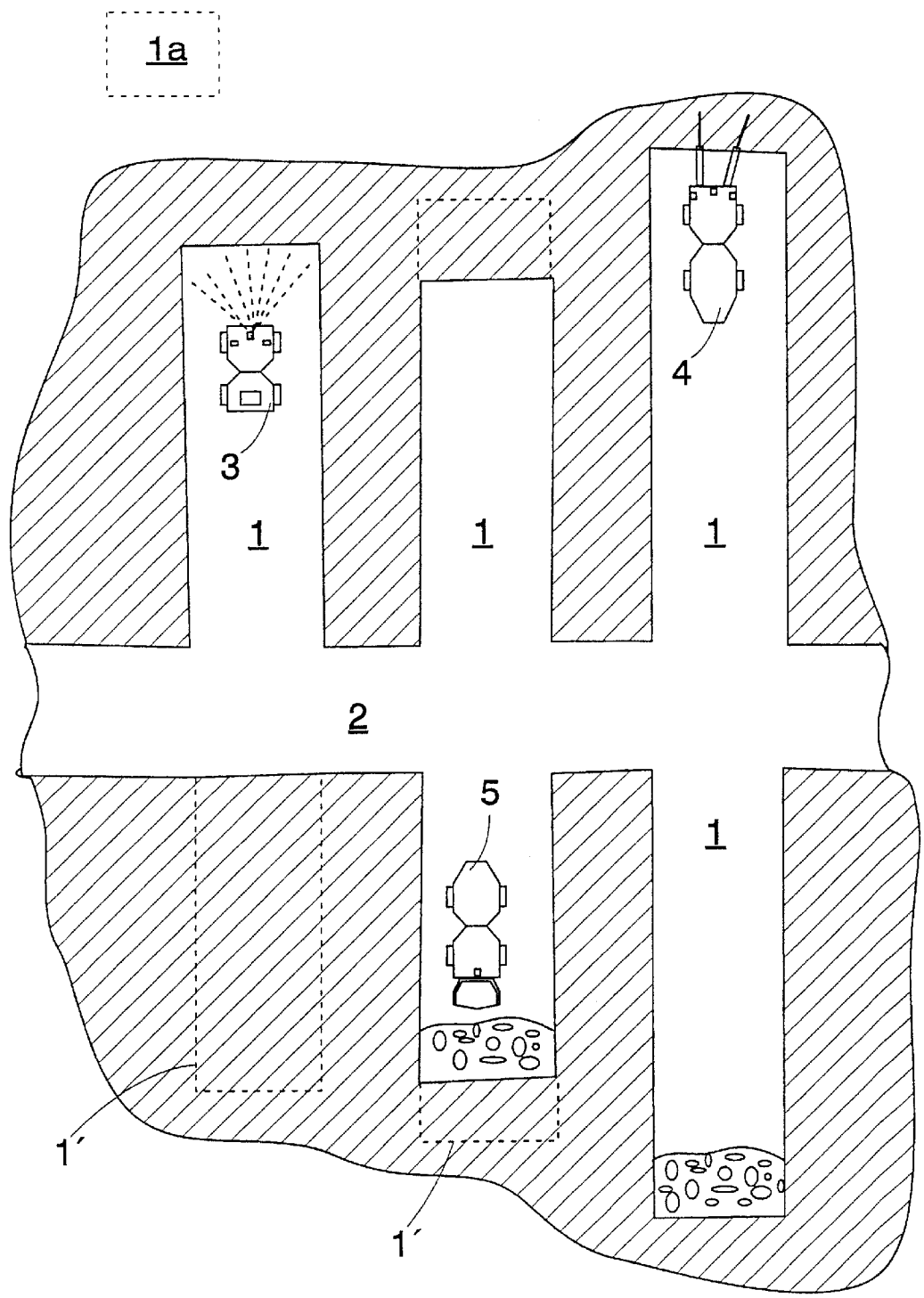

A part of a mine shown in FIG. 1 comprises mine galleries 1 mined according to a pre-made mining plan, and a service gallery 2. Mine galleries and parts of them, which are in accordance with the mining plan and are not yet mined, are marked with a broken line 1' in the figure. The mine as such is fully known by a person skilled in the art, and therefore it is unnecessary to handle it in greater detail herein. An unmanned mine comprises a control room 1a positioned in favourable conditions above the ground or elsewhere outside the actual operating place, from where unmanned mining vehicles in the mine are controlled. Thus, by using wireless data transmission there is a connection between the control room and the mining vehicle. Video pictures and measurement information, for instance, are transmitted from the mining vehicles to the control room by means of various measuring means arranged in the mining vehicle, and, correspondingly, control information is transmitted from the control room to the mining vehicles. As an example, the figure shows a measuring vehicle 3, a rock drilling apparatus 4 and a loading vehicle 5.

Figure 2:
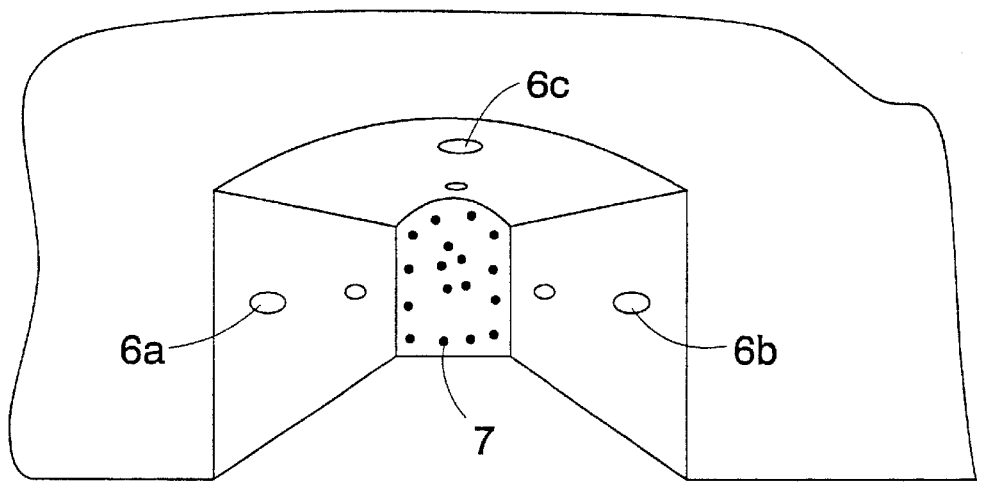

Thus, a specific teleoperated measuring vehicle 3 provided with the required measuring means is used in an unmanned mine. The mine or the desired parts of the mine are measured by means of the measuring vehicle, whereupon a digital map of the realized mine can be formed by means of computers in the control room and the map can be compared with the mining plan of the mine. The real state of the mine can thus be updated and potential deviations can be noticed in time. The measuring vehicle comprises, for instance, an inertial measuring device and ultrasonic scanners, which transmit information on the basis of which a three-dimensional digital map of the mine can be created. The measuring vehicle is shown in more detail later in FIG. 4. According to the idea of the invention, the measuring vehicle is provided with a marking device for making control marks in the mine galleries, on the walls and/or roof of the mine gallery, for other mining vehicles. This is illustrated in FIG. 2 where the tunnel comprises positioning marks 6a to 6c. In this case, the marks are circles painted on the surface of the rock. The figure also shows drill holes 7 to be charged.

Figure 3:
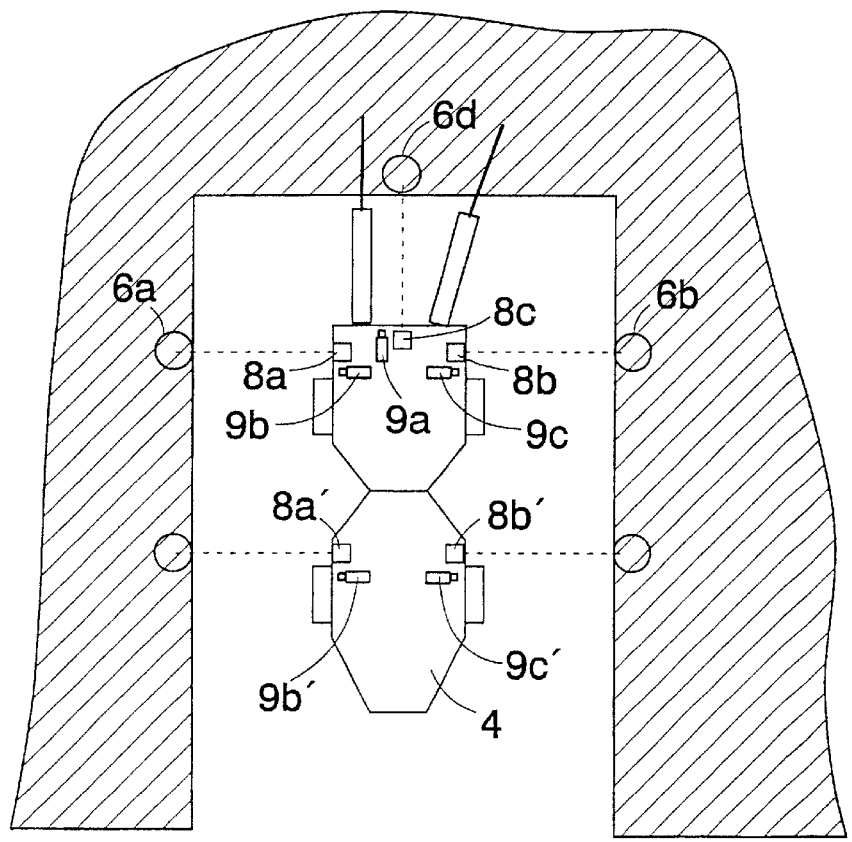

FIG. 3 shows a top view of an unmanned remote-controlled rock drilling apparatus 4, and light sources 8a and 8b, such as lasers, pointing to the side perpendicularly to the central axis of the rock drilling apparatus are fixedly arranged onto the base of the apparatus, on its both sides. The rock drilling apparatus may also have light sources 8c pointing to the roof of the mine gallery and/or to the back wall of the mine gallery, for determining the inclination angle of the rock drilling apparatus and further for determining the transverse displacement of the apparatus in the mine gallery. The operator drives the rock drilling apparatus in a remote-controlled manner into a mine gallery to be operated and utilizes thereby pictures transmitted by a video camera 9a arranged in the mining vehicle. Using the video cameras 9a to 9c directed forwards and to the sides, the operator sees the light beams transmitted by the light sources 8a to 8c on the side and end wall of the gallery, and on the basis of this information, the operator drives the rock drilling apparatus such that the light beams hit the positioning marks. The rock drilling apparatus may alternatively have other kinds of sighting means, by which its position in respect of the positioning marks can be observed. AU publication 700 301, for instance, discloses a rock drilling apparatus, in which positioning lights mentioned earlier are replaced by a video camera or a corresponding optical system. In order to position the rock drilling apparatus exactly, it is sufficient that the position of the vehicle is determined in respect of three positioning marks. The absolute inclination angle of the mining vehicle in respect of its longitudinal and transversal axes can be determined easily by means of electrically readable levels or similar levelling instruments. The mining vehicle is driven to the right vertical position by means of hydraulic supports, for example.

FIG. 3 also shows a second set of light sources 8a' and 8b' and a second set of cameras 9b' and 9c' in the rear part of the rock drilling apparatus, whereby the same positioning marks can be utilized in the drilling of more than one rounds. Thus the interval between the measurements carried out by the measuring vehicle in the mine gallery can be made longer.

Figure 4:
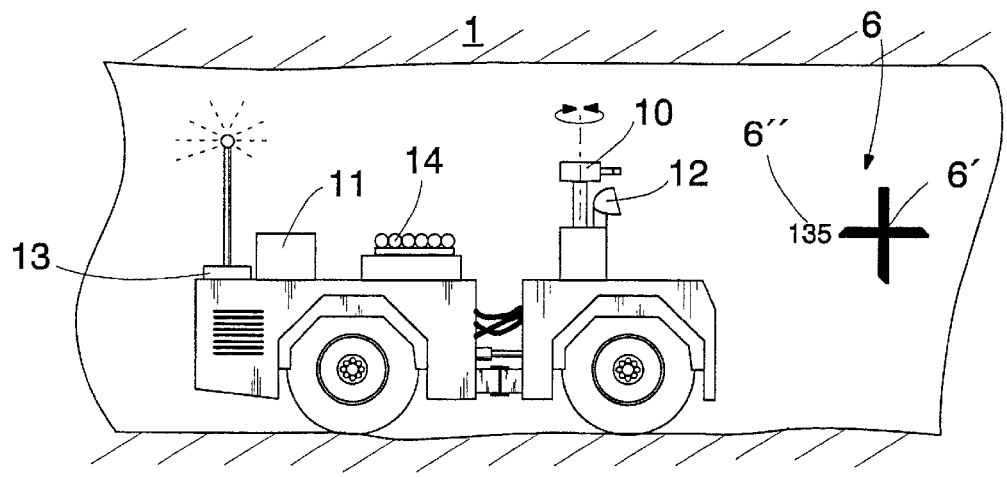

FIG. 4 shows a measuring vehicle comprising a base that can be moved independently, control means arranged on the base, and also means for transmitting data between the measuring vehicle and a control room. The measuring vehicle may further comprise at least one turnably arranged video camera 10 whose pictures are transmitted to the control room. The vehicle is driven in the mine mainly on the basis of the pictures from the video camera. The mine can be measured by means of an inertial measuring device 11 arranged in the vehicle, and at least one scanner 12. The inertial measuring device produces continuous location information on the position of the measuring vehicle in the mine. The shape of the mine gallery can be measured by means of ultrasonic scanners or similar scanners. The measurement results are transmitted by means of a data communication unit 13 to the control room of the system, where the results can be processed by a computer. By using the measuring vehicle, measurements can be carried out whenever required. After the blocks have been exploded and transported away from the mine gallery by a loading vehicle, the measuring vehicle is usually driven to this gallery and the new section of the formed gallery is measured. In this way, the control system of the mine is updated.

Figure 5:
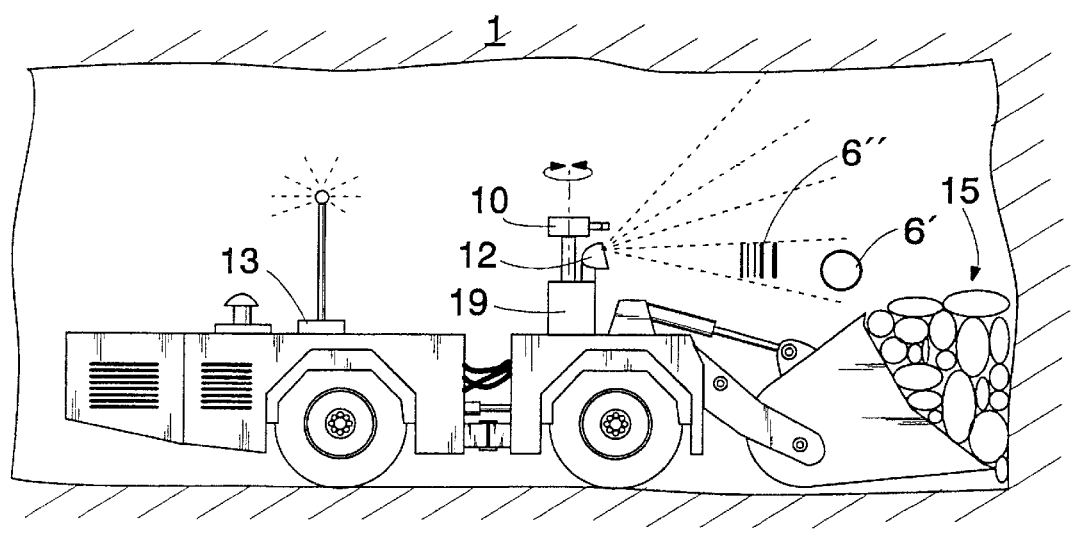

A control mark 6 shown in FIG. 4 comprises a positioning mark 6', at which an aiming mark arranged in connection with the rock drilling apparatus to be positioned, or a light beam is directed. At its simplest, the positioning mark is a cross painted on the surface of the rock. Alternatively, the mark can be a circle, as shown, for example, in FIGS. 2 and 5. When the light beam hits inside the surface defined by the circle, the mining vehicle is positioned accurately enough to the right position. As shown by FIGS. 4 and 5, in addition to the positioning mark, the control mark can also comprise other information useful in controlling mining vehicles. Thus, there can be an identification, such as consecutive numbers painted on the rock surface, in connection with it, whereby the operator in the control room of the system clearly sees from the video picture, which mark it is in which case. Furthermore, location information 6", such as altitude or coordinates, can be marked in connection with the mark.

The identification and location information can also be marked as a code, which is read by means of a reader in the mining vehicle. A bar code according to FIG. 5, for instance, is suitable for this purpose, because it can be machine-read by means of an optical reader of the mining vehicle, such as a scanner or a raster camera. The positioning marks can be painted by means of sprays 14 arranged in the measuring vehicle. Although the painting of positioning marks is a means both simple and cheap, the marking can also be arranged in other ways, the shooting of coloured bullets and positioning means based on transmitters, for instance, being mentioned herein. In the last mentioned case, a suitable receiver is the reader.

FIG. 5 shows a loading vehicle 5 by which the blocks are transported or loaded in order to be transported away from the mine gallery. Such a vehicle also comprises a video camera 10 which transmits pictures from the mine to the control room. The loading vehicle also comprises a reader 12 by which the shapes of the mine gallery 1 and block heap 15 to be loaded are read. Marks 6 made by the measuring vehicle can be utilized for determining the position of the loading vehicle. On the basis of the picture conveyed by the video camera, the operator sees the positioning marks 6' and the identification and/or location information 6" in connection with them on the gallery walls.

The positioning marks can also be automatically read by means of a reader, e.g. a laser scanner, of the mining vehicle, whereupon the vehicle can also be controlled entirely automatically by means of location information in the marks. The reading of the marks can also be carried out by a raster camera, or a video camera and an image processing program connected to it. The information read from the marks is converted into electrical signals, which are supplied to a control unit 19 of the mining vehicle to be used as control parameters.

Figure 6:
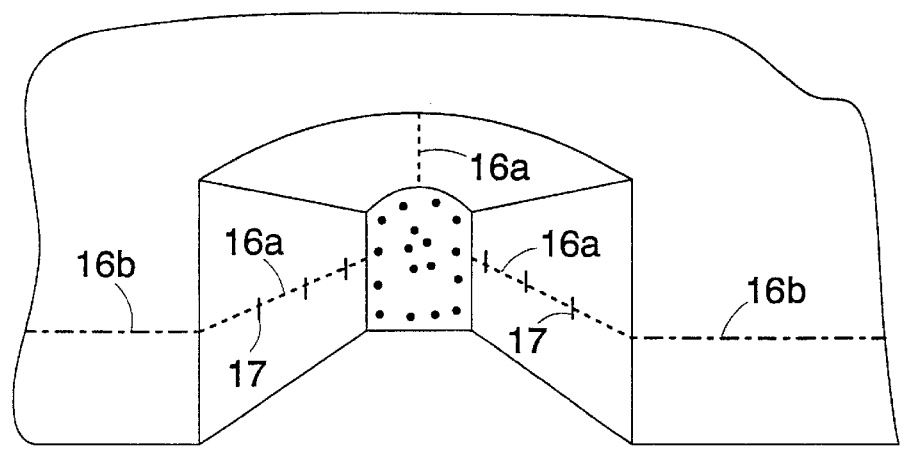
Figure 7:
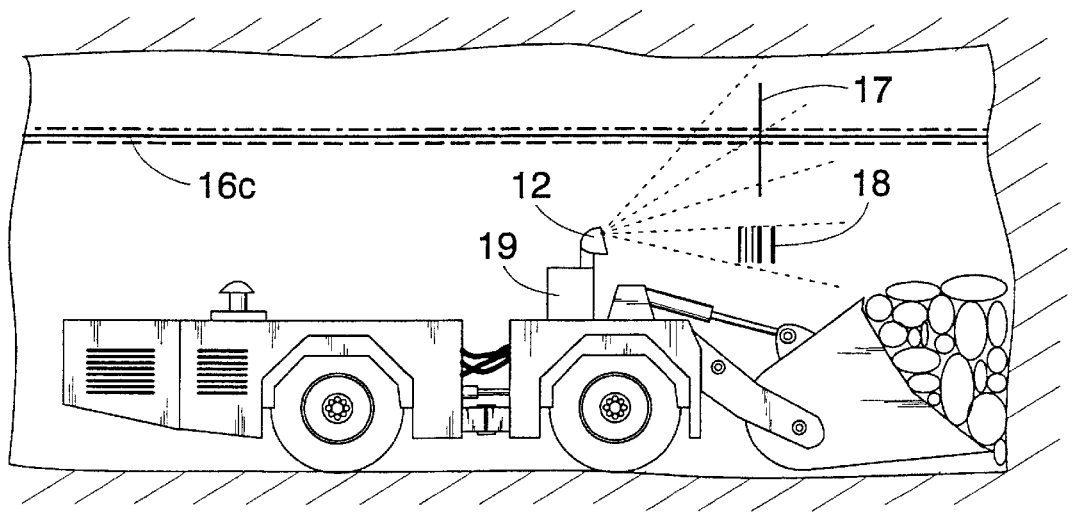

FIGS. 6 and 7 show a further embodiment in which the control marks comprise mark sequences 16 painted by the measuring vehicle onto the wall surfaces and/or roof of the mine gallery. The mining vehicle can be made to follow such a mark sequence either from the control room by means of a video camera, or the mining vehicle reads the mark sequence independently and follows it. Different driving routes can be marked in the mine, for instance, by using a continuous/discontinuous mark sequence, by combining different mark sequences as in FIG. 7, by using different colours and reflecting materials in the marking etc. A positioning mark 17, such as a transverse line, can be marked into the mark sequence 16. There can also be identification/location information 18 in connection with the mark sequence.

The drawings and the related description are only intended for illustrating the idea of the invention. In its details, the invention may vary within the scope of the claims. Thus, instead of fixed means, the mining vehicle may comprise a turnable light source and a camera, which both have their predetermined turning positions in respect of the frame of the mining vehicle. They can thus be turned accurately to a right position to both sides of the vehicle, directly forwards and, if required, perpendicularly upwards to the roof. Consequently, compared with the solution shown in FIG. 3, it is sufficient to have one light source and one camera in one mining vehicle. In the corresponding manner, paint sprayers or similar marking devices can be moved and controlled in a variety of ways. Furthermore, when directing the drilling, the control system can comprise means which take into account potential deviations of the drilling base from the accurate position defined by the positioning marks and determine the compensated drilling directions.

What is claimed is:

1. A method of determining the position of unmanned mining vehicles, the method comprising:

measuring excavated mine galleries by means of an unmanned measuring vehicle, marking control marks in the mine galleries by means of a marking device in the measuring vehicle, and using the control marks in controlling a mining vehicle.

2. A method as claimed in claim 1, comprising:

painting the control marks on the walls/roof of the mine gallery by means of paint sprayers in the measuring vehicle.

3. A method as claimed in claim 1, comprising:

using a positioning mark as the control mark.

4. A method as claimed in claim 1, comprising:

using readable location/identification information as the control mark.

5. A method as claimed in claim 4, comprising:

reading the location information in connection with the control mark by means of a reading device in the mining vehicle and transmitting it to a control system of the device.

6. A method as claimed in claim 1, comprising:

controlling the mining vehicles from a control room outside a mine section to be operated by using wireless data transmission between said control room and the unmanned mining vehicle, emitting a light beam at least to both sides of the vehicle, monitoring the position of the light beams in respect of control marks by means of one or more video cameras in the mining vehicle, transmitting the picture of the mine to the control room in order to control the mining vehicles, and driving on the basis of control information transmitted by the video camera, the rock drilling apparatus to a position where the light beams are positioned in a predetermined manner in respect of the control marks made by the measuring vehicle onto the mine gallery.

7. A measuring vehicle comprising:

a mobile base, control devices for driving it unmanned in a mine from a control room arranged outside a mine section to be operated, a data communication unit for transmitting control and measurement information between the control room and the vehicle, at least one measuring device by which a mine gallery is measured, and at least one marking device for marking control marks onto the mine gallery in order to control other mining vehicles and determine the position thereof.

8. A measuring vehicle as claimed in claim 7, wherein the measuring vehicle is provided with one or more paint sprayers for painting the control marks onto the mine gallery.

9. A measuring vehicle as claimed in claim 7, wherein the measuring vehicle comprises means for marking location/identification information in connection with the control mark.

10. A measuring vehicle as claimed in claim 7, wherein the measuring vehicle comprises means for marking a bar code in connection with the control mark.

* * * * *